(12) United States Patent
Ko

(10) Patent No.: US 11,772,792 B2
(45) Date of Patent: Oct. 3, 2023

(54) PARADRONE

(71) Applicant: Yeong Uk Ko, Suwon-si (KR)

(72) Inventor: Yeong Uk Ko, Suwon-si (KR)

(*) Notice: Subject to any disclaimer, the term of this patent is extended or adjusted under 35 U.S.C. 154(b) by 469 days.

(21) Appl. No.: 16/977,034

(22) PCT Filed: Feb. 26, 2019

(86) PCT No.: PCT/KR2019/002300
§ 371 (c)(1),
(2) Date: Aug. 31, 2020

(87) PCT Pub. No.: WO2019/168316
PCT Pub. Date: Sep. 6, 2019

(65) Prior Publication Data
US 2021/0039780 A1      Feb. 11, 2021

(30) Foreign Application Priority Data

Mar. 2, 2018  (KR) .................. 10-2018-0025152
Mar. 2, 2018  (KR) .................. 10-2018-0104599

(51) Int. Cl.
*B64C 39/02*      (2023.01)
*B64D 17/02*      (2006.01)
(Continued)

(52) U.S. Cl.
CPC .......... *B64C 39/024* (2013.01); *B64D 17/025* (2013.01); *B64D 17/04* (2013.01);
(Continued)

(58) Field of Classification Search
CPC ... B64C 39/024; B64C 31/036; B64D 17/025; B64D 17/04; B64D 17/62; B64D 17/80; B64U 10/50; B64U 2201/00
See application file for complete search history.

(56) References Cited

U.S. PATENT DOCUMENTS 8,448,898 B1 *  5/2013  Frolov .................... H02S 20/00
                                                      244/59
10,029,786 B1 *  7/2018  Adams .................. B64D 17/30
(Continued)

FOREIGN PATENT DOCUMENTS

KR    10-2000-0052658 A    8/2000
KR       10-0661309 B1    12/2006
(Continued)

*Primary Examiner* — Justin M Benedik
(74) *Attorney, Agent, or Firm* — Maschoff Brennan

(57) ABSTRACT

A paradrone includes a canopy having a parafoil, a transverse canopy frame coupled to the parafoil to support the parafoil, a longitudinal canopy frame that is coupled to the parafoil while having a bent structure such that the parafoil generates a lift, and at least one parafoil connecting portion for connecting at least one canopy frame among the transverse canopy frame and the longitudinal canopy frame to the parafoil. The paradrone also includes a servomotor portion having a servomotor body and a servomotor arm for coupling and fixing intersecting parts of the transverse canopy frame and the longitudinal canopy frame. The servomotor arm is connected to a servomotor body and rotated in a predetermined direction by driving of the servomotor body to change the angle between the travelling direction of the paradrone fuselage and the transverse and longitudinal canopy frames, thereby changing the angle of attack.

6 Claims, 6 Drawing Sheets

(51) Int. Cl.
  *B64D 17/04* (2006.01)
  *B64D 17/62* (2006.01)
  *B64D 17/80* (2006.01)
  *B64U 10/50* (2023.01)

(52) U.S. Cl.
  CPC ............ *B64D 17/62* (2013.01); *B64D 17/80* (2013.01); *B64U 10/50* (2023.01); *B64U 2201/00* (2023.01)

(56) References Cited

U.S. PATENT DOCUMENTS

| | | | |
|---|---|---|---|
| 10,279,902 B2 * | 5/2019 | Childress | B64C 29/0091 |
| 2002/0193914 A1 * | 12/2002 | Talbert | B64C 39/024 |
| | | | 701/2 |
| 2008/0083847 A1 * | 4/2008 | Mau | B64C 3/46 |
| | | | 244/902 |
| 2012/0104151 A1 * | 5/2012 | Mccann | B64D 1/08 |
| | | | 244/137.4 |
| 2021/0039778 A1 * | 2/2021 | Wallace-Morrison | |
| | | | B64D 17/80 |

FOREIGN PATENT DOCUMENTS

| | | |
|---|---|---|
| KR | 10-2012-0032788 A | 4/2012 |
| WO | 2010/062274 A1 | 6/2010 |
| WO | 2010062274 A1 | 6/2010 |

\* cited by examiner

[FIG. 1]
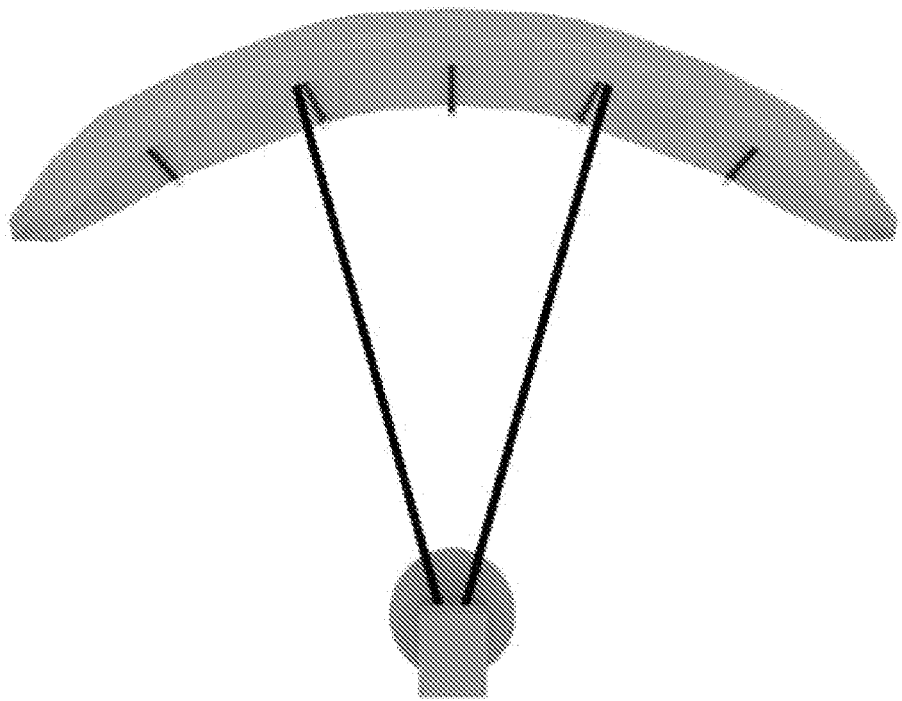
[FIG. 2]
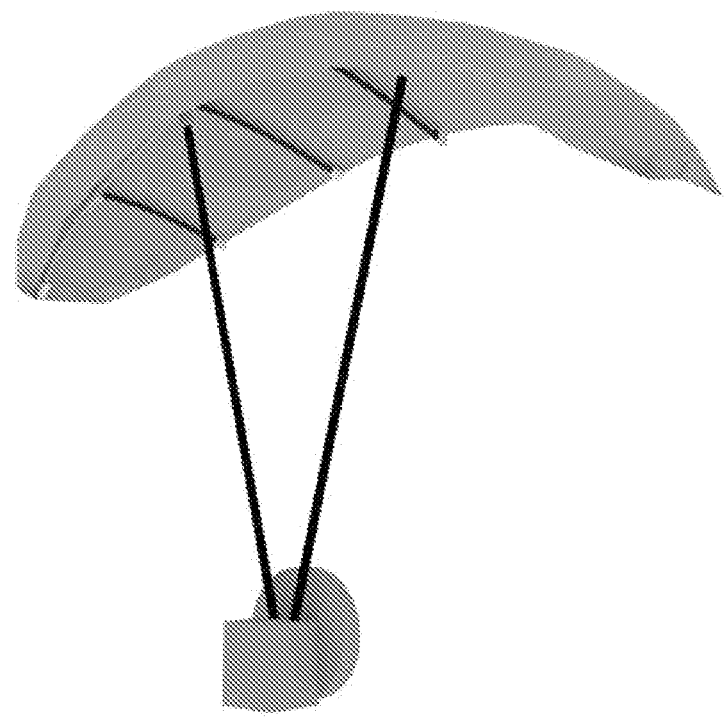

[FIG. 3]
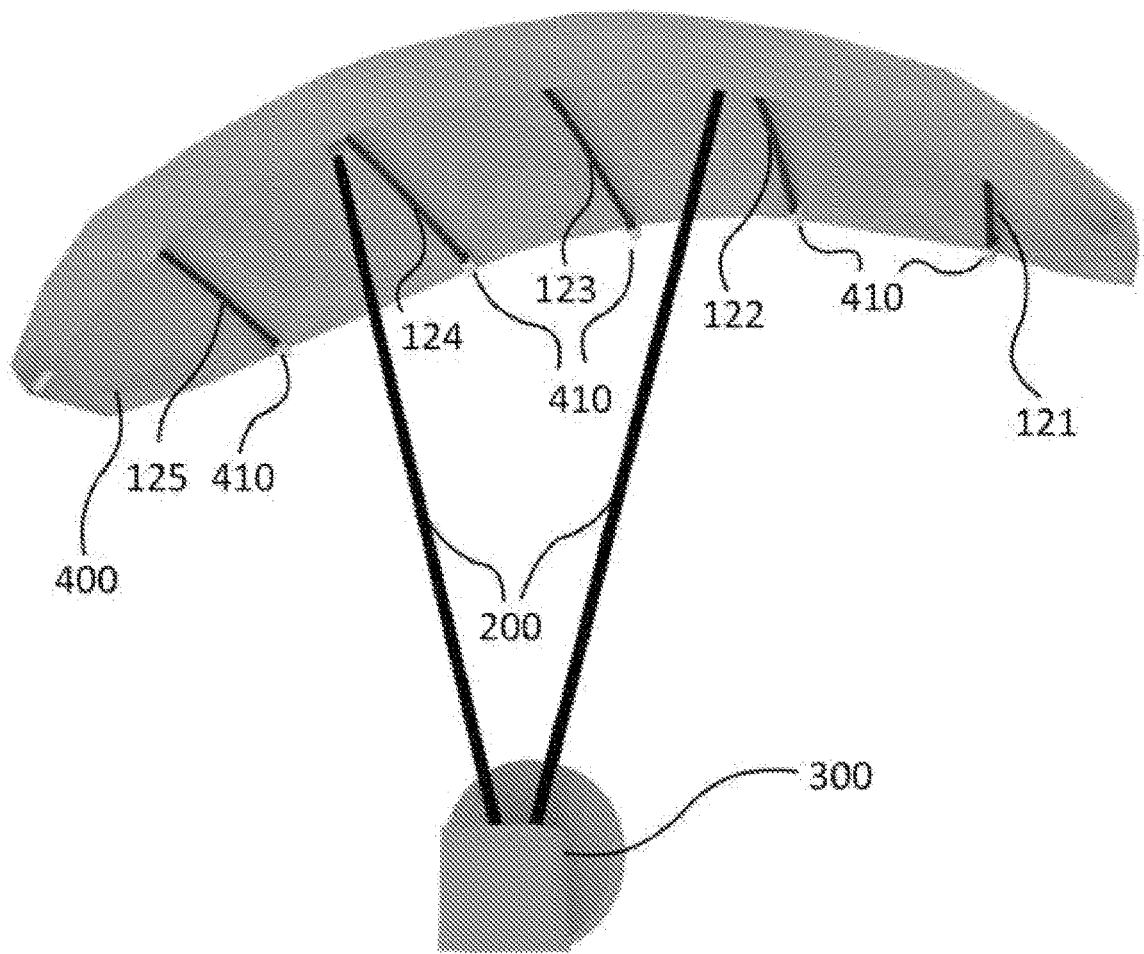
[FIG. 4]
110 = 111 + 112 + 113
120 = 121 + 122 + 123 + 124 + 125
130 = 131 + 132 + 133 + 134 + 135
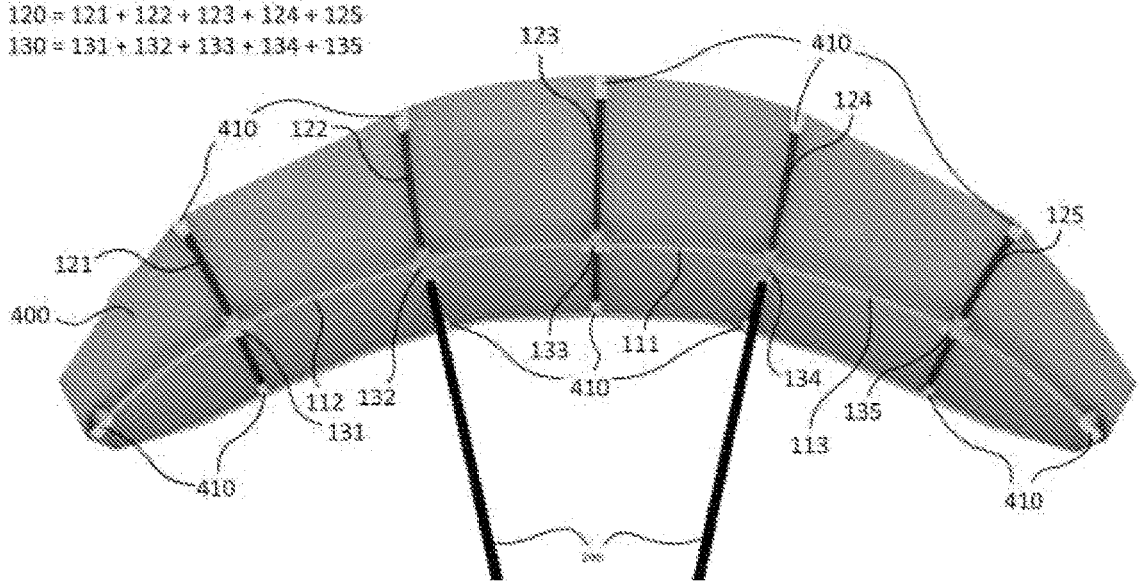

[FIG. 5]
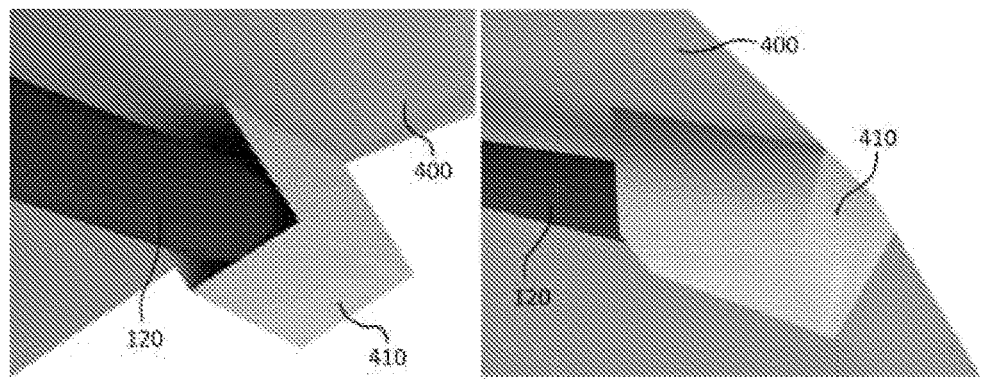
[FIG. 6]
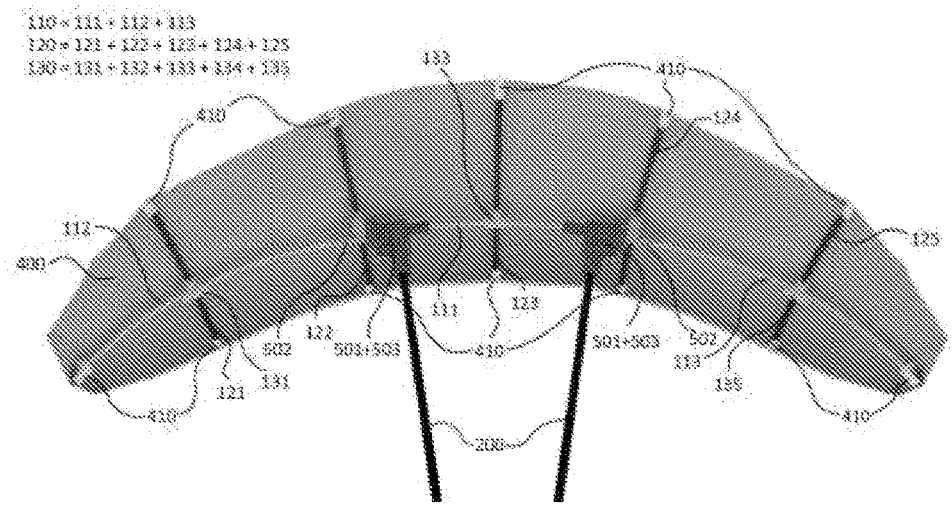
[FIG. 7]
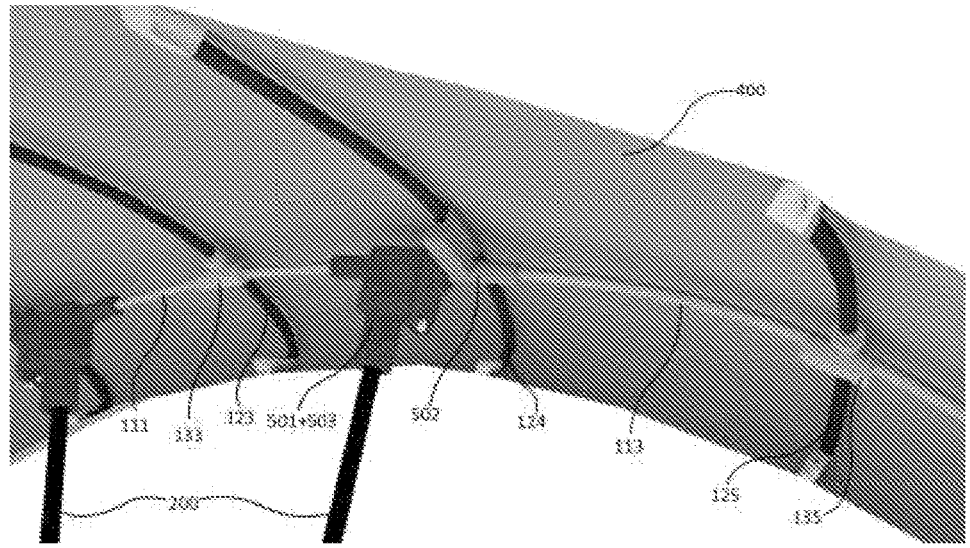

[FIG. 8]
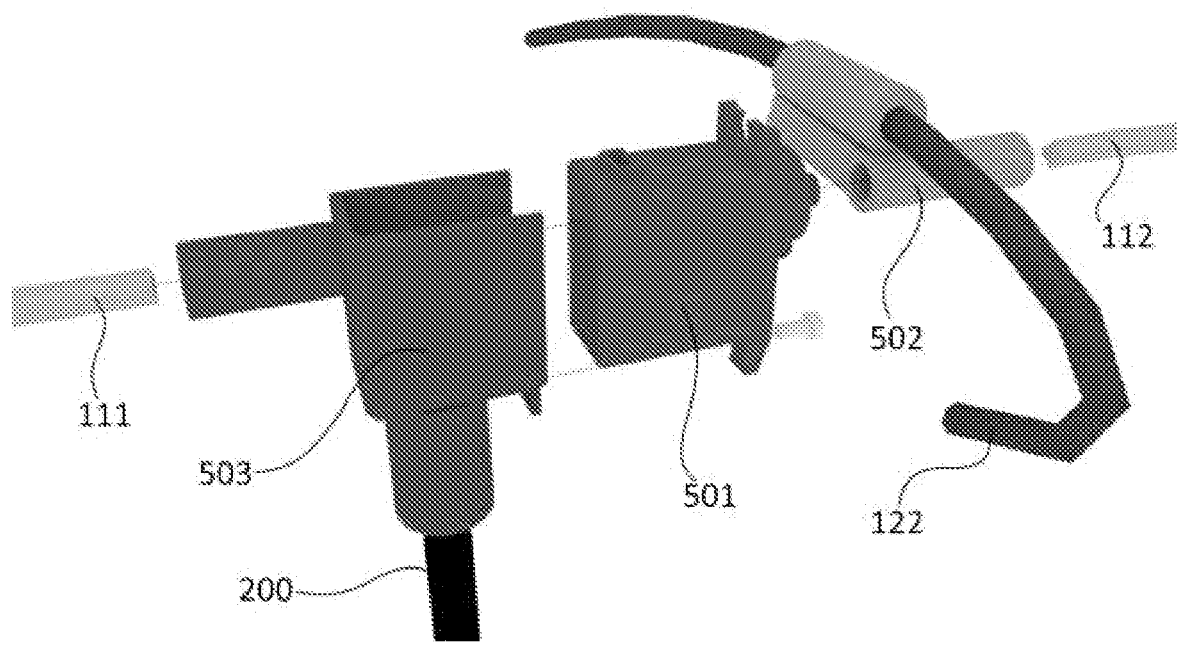
[FIG. 9]
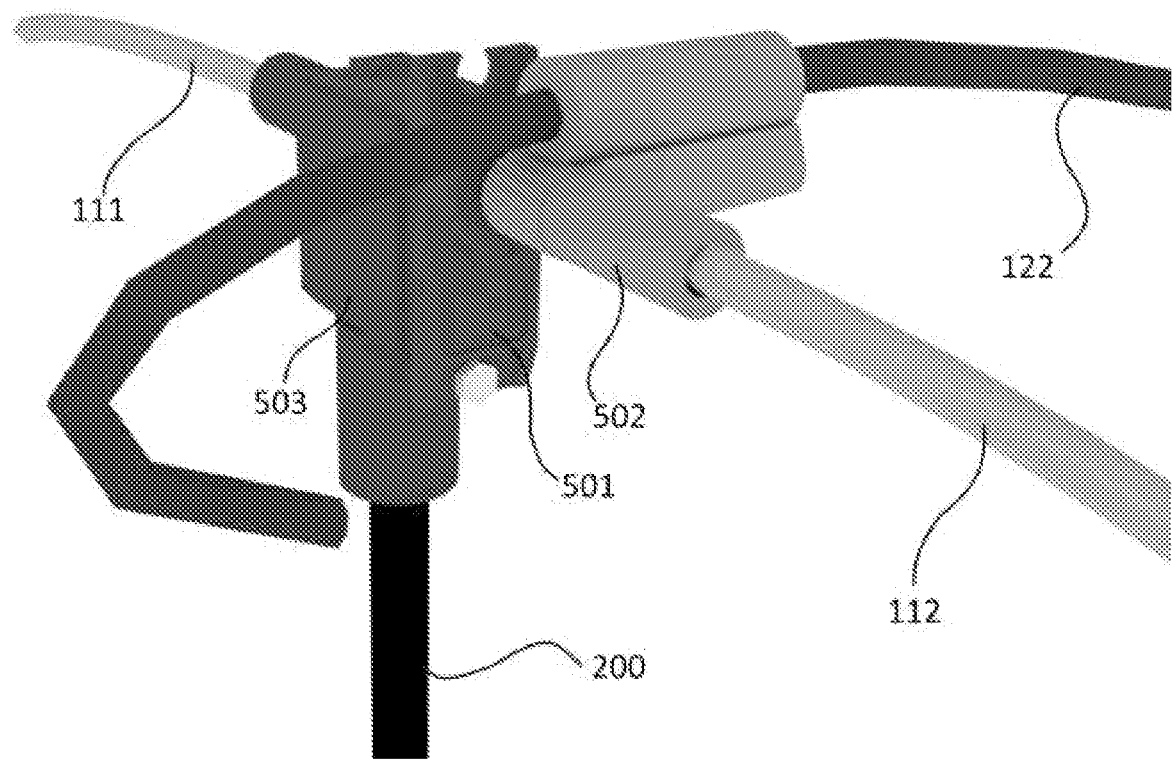

[FIG. 10]
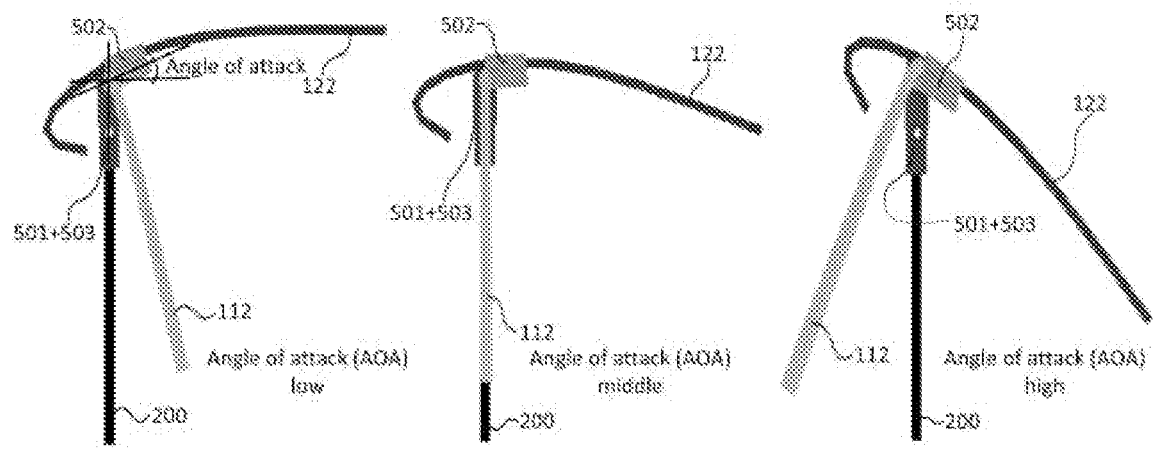
[FIG. 11]
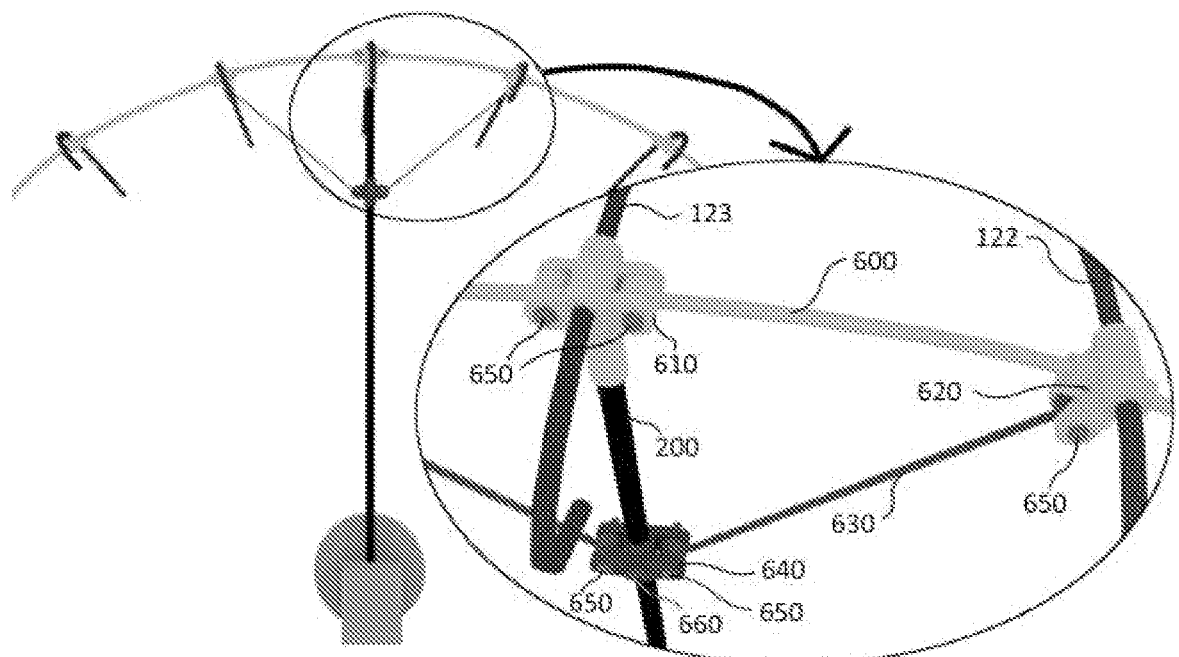

[FIG. 12]
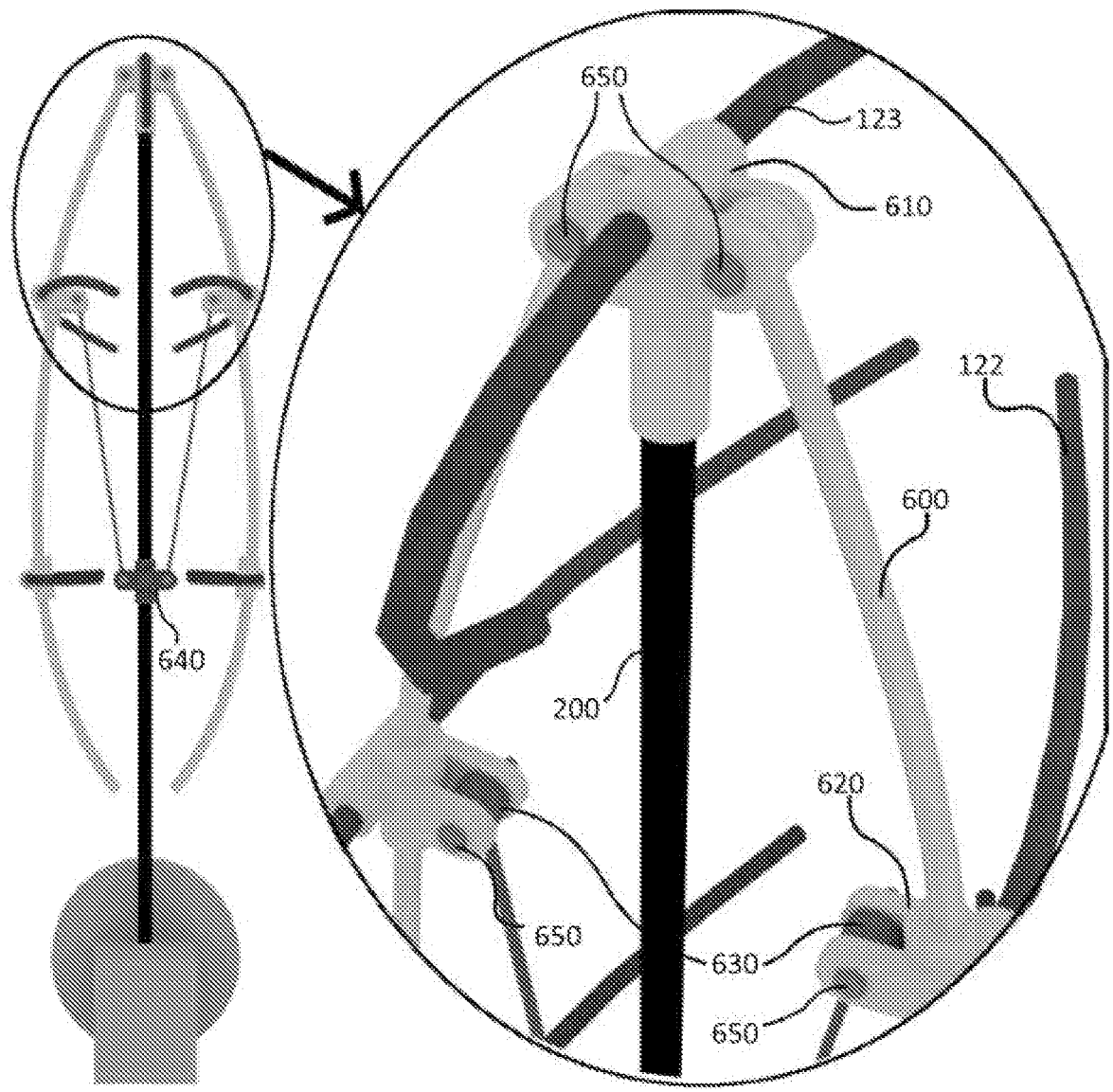

PARADRONE

FIELD OF INVENTION

The present invention relates to aircraft, unmanned aerial vehicles, drones, and radio controlled (RC) powered paragliders.

BACKGROUND OF INVENTION

The existing power paraglider consists of a canopy (wing), lines, a drive unit and a control unit (harness, hereinafter a "drive control unit"). The canopy is made of cloth, and the lines are connected to the drive control unit. The drive control unit comprises a motor, a controller, a communication module, a battery, and the like.

The power paraglider may involve the following advantages. Compared to a multi-rotor consisting of several motors (quadcopter, etc.), a flight time is longer because a single motor is used to operate the power paraglider. Further, even in an emergency situation wherein the drive control unit does not work, the canopy plays as a parachute so as to prevent the paraglider from falling down due to a free fall speed, thereby reducing possibility of damage to a fuselage of the paraglider.

Disadvantages of the existing power paraglider are as follows.

The canopy made of cloth may be folded in side winds and/or gust and cannot maintain the original shape of the wings, hence falling or becoming uncontrollable.

Further, since the canopy and the drive control unit are connected by flexible lines, the canopy may not be located and supported on top of the drive control unit. For this reason, it is not easy to takeoff. Further, the lines between the canopy and the drive control unit may be twisted from side to side to thus cause an uncontrollable condition. In addition, the canopy may require high manufacturing cost. For instance, a process of manufacturing the existing canopy is described as follows.

In the manufacturing of the canopy, top and bottom plates and bulkheads between the top and bottom plates should be cut and sewn to have pores (air inlets), followed by connecting dozens of lines, wherein each line must have different lengths in order to keep the canopy in an arched shape. Such works described above are manually done to incur high manufacturing expenses.

Further, an attack angle of the canopy cannot be altered. This is a structural limitation that makes it impossible to fly at high speed. The drive control unit located on the bottom will move forward before the canopy when output power is increased for high speed flight. This causes the attack angle of the canopy to be too large, which is not suitable for high-speed flight.

SUMMARY OF INVENTION

Technical Problem to be Solved

A technical object of the present invention is to provide a paradrone that can overcome disadvantages of the existing power paraglider whereas adding advantages thereof, so as to be applicable to the field of unmanned aerial vehicles. Further, another object of the present invention is to provide a paradrone that can overcome a difficulty in takeoff, wind folding, line twisting, high manufacturing cost, high-speed flight, etc., by changing canopy fabrication materials and a method of connecting the canopy and the drive control unit.

Technical Solution

A paradrone according to an embodiment of the present invention may include: a canopy, which is provided with a parafoil, a horizontal canopy frame coupled to the parafoil to support the parafoil, a longitudinal canopy frame that is coupled to the parafoil while having a bent structure to make the parafoil to generate lift force and is configured to intersect with the horizontal canopy frame, and at least one parafoil coupler to couple at least one among the horizontal canopy frame and the longitudinal canopy frame to the parafoil; and a servomotor unit.

The servomotor unit may include: a servomotor body; a servomotor body coupler coupled to the servomotor body to accommodate the servomotor body; and a servomotor arm that couples and secures the intersect portion of the horizontal canopy frame and the longitudinal canopy frame.

The servomotor arm may be connected to the servomotor body and rotate in a predetermined direction by driving the servomotor body, in order to alter an angle formed between the horizontal and longitudinal canopy frames and a travelling direction of a fuselage of the paradrone, thereby changing an angle of attack ("attack angle").

The paradrone according to an embodiment of the present invention may further include a drive control unit for supplying a driving force, as well as a connection rod for connecting the drive control unit and the canopy.

The at least one frame coupler is a foldable coupler to vary and fix a coupling angle of the horizontal canopy frame and the connection rod.

A paradrone according to another embodiment of the present invention may include:

a canopy, which is provided with a parafoil, a horizontal canopy frame coupled to the parafoil to support the parafoil, a longitudinal canopy frame that is coupled to the parafoil while having a bent structure to make the parafoil to generate lift force and is configured to intersect with the horizontal canopy frame, and at least one parafoil coupler to couple at least one among the horizontal canopy frame and the longitudinal canopy frame to the parafoil.

The paradrone may further include a drive control unit for supplying a driving force, as well as a connection rod for connecting the canopy and the drive control unit.

A paradrone according to another embodiment of the present invention may include:

a canopy, which is provided with a parafoil, a horizontal canopy frame coupled to the parafoil to support the parafoil, a longitudinal canopy frame that is coupled to the parafoil while having a bent structure to make the parafoil to generate lift force and is configured to intersect with the horizontal canopy frame, and at least one parafoil coupler to couple at least one among the horizontal canopy frame and the longitudinal canopy frame to the parafoil; a drive control unit for supplying a driving force; a connection rod to connect the canopy and the drive control unit; left and right servomotors as well as servomotor arms, which are driven differently and are fixed to the connection rod or the drive control unit; and lines connected to the left and right servomotor arms, respectively.

In addition, since the lines are connected to the servomotor arms on left and right sides at the rear of the parafoil, respectively, these lines may pull a left or right tail of the parafoil downward to change a direction when the servomotor arms are driven.

Effect of Invention

1. In manufacturing a parafoil, many lines are not required, and pores and bulkheads to inhibit folding are also not needed, so as to drastically reduce manufacturing costs while enabling mass production.

2. A canopy frame made of a material having a desired strength may prevent the canopy from folding.

3. A canopy and a drive control unit are connected together by a connection rod without any line so as to support the entire paradrone shape, thereby improving stability during takeoff and in flight.

4. No line is used to thus eliminate a drawback of the line to be twisted and inoperable.

5. Directions are adjustable without any line.

6. A method of adjusting an attack angle depending upon purpose or use of flight is provided to thus expand a range of utility. That is, a large attack angle is advantageous for low-speed flight while a small attack angle is advantageous for high-speed flight. For instance, low-speed flight is advantageous for photography, while high-speed flight may be advantageous for long distance travel.

BRIEF DESCRIPTION OF DRAWINGS

FIG. 1 is a front view according to a first embodiment of the present invention;

FIG. 2 is a front perspective view according to the first embodiment of the present invention;

FIG. 3 is a front perspective view illustrating the names of respective parts according to the first embodiment of the present invention;

FIG. 4 is a rear view illustrating the names of respective parts according to the first embodiment of the present invention;

FIG. 5 is a partially enlarged view illustrating a parafoil coupler according to an embodiment of the present invention;

FIG. 6 is a rear view illustrating the names of respective parts according to a second embodiment of the present invention;

FIG. 7 is an enlarged rear perspective view illustrating the names of respective parts according to the second embodiment of the present invention;

FIG. 8 is an exploded view of a servomotor unit according to the second embodiment of the present invention;

FIG. 9 shows a coupling diagram of a servomotor unit according to the second embodiment of the present invention;

FIG. 10 is a side view showing that an attack angle varies along an angle of the servomotor arm according to the second embodiment of the present invention;

FIG. 11 is an enlarged view illustrating the names of respective parts of the expanded (or unfolded) canopy configured in a folding mode according to a third embodiment of the present invention; and FIG. 12 is an enlarged view illustrating the names of respective parts of the folded canopy configured in a folding mode according to the third embodiment of the present invention.

DETAILED DESCRIPTION OF PREFERRED EMBODIMENTS OF INVENTION

Hereinafter, a description will be given with regard to the structure of the parafoil, the configuration and role of the canopy frame, the drive control unit and the connection rod according to embodiments of the present invention, as well as the first, second and third embodiments, respectively.

Parafoil 400

The parafoil 400 shown in FIG. 3 and FIG. 4 is manufactured using a flexible and light material such as cloth. In addition to the cloth, it may also be made of other materials such as vinyl materials (PVC).

The parafoil 400 may be cut to the same size as horizontal and longitudinal canopy frames, and may be provided with a parafoil coupler 410 to connect the parafoil to the horizontal canopy frame 110 and the longitudinal canopy frame 120.

Parafoil Coupler 410

A parafoil coupler 410 serves to couple the parafoil 400 and the canopy frames 110 and 120. There are different methods of connecting the parafoil 400 to the canopy frames 110 and 120. For instance, a method of fixing the canopy frame by back-stitches (or sewing machine stitches) in fabrication of the parafoil may be used. Further, as in the present embodiment, the parafoil coupler 410 may be added and the parafoil 400 may be fabricated to be attached to/detached from the canopy frame.

FIG. 5 illustrates a method of padding and back-stitching a cloth at a position where the canopy frame is coupled, so that both ends of the frame canopy can be inserted into the cloth.

Canopy Frame

The canopy frame may be made of a material having high strength, such as wood, plastic, carbon, metal, etc. In addition to the above materials, any material having strength may be possibly used.

The canopy frame may be configured by combining one or more horizontal canopy frames 110 and one or more longitudinal canopy frames 120 with a frame coupler 130.

The number of horizontal and longitudinal canopy frames, respectively, may vary depending on a size of the canopy, and materials and strength of the canopy frame.

As shown in FIG. 4, the canopy frame may include a horizontal canopy frame 110, a longitudinal canopy frame 120 and a frame coupler 130, which will be commonly referred to as a canopy frame.

Horizontal Canopy Frame 110

In FIG. 4, a middle horizontal canopy frame 111, a left horizontal canopy frame 112 and a right horizontal canopy frame 113, which are perpendicular to a travelling direction of the paradrone fuselage, will be commonly referred to as the horizontal canopy frame 110.

The three frames 111, 112 and 113 may be configured as a single frame. Further, 2 or 3 left and right parts may be separately manufactured and then joined with the frame coupler 130.

The horizontal canopy frame 110 may serve to support the canopy in order to prevent the canopy from being folded by side winds.

Longitudinal Canopy Frame 120

In FIG. 4, a first longitudinal canopy frame 121, a second longitudinal canopy frame 122, a third longitudinal canopy frame 123, a fourth longitudinal canopy frame 124 and a fifth longitudinal canopy frame 125, which are parallel to a traveling direction of the paradrone fuselage, will be commonly referred to as the longitudinal canopy frame 120.

The longitudinal canopy frames 121 to 125, respectively, are coupled to the horizontal canopy frame 110 through the frame coupler 130. Further, the longitudinal canopy frames 121 to 125 may also be joined with the parafoil to maintain a shape of the canopy (wing), and may serve to maintain the bent upper end of the canopy so as to generate lift force to the traveling direction of the paradrone fuselage.

Frame Coupler 130

In FIG. 4, a first frame coupler 131, a second frame coupler 132, a third frame coupler 133, a fourth frame coupler 134 and a fifth frame coupler 135 will be commonly referred to as the frame coupler 130.

Each horizontal canopy frame 110 and each longitudinal canopy frame 120 are connected and fixed to each frame coupler 130, and may serve to maintain the shape of the canopy.

The frame coupler 130 may be sewn to or combined with the parafoil 400 by other methods. Alternatively, the frame coupler may not be combined with the parafoil, however, is preferably combined with the parafoil.

In FIG. 4, the second frame coupler 132 and the fourth frame coupler 134 are joined with the connection rod 200 from below. According to the number of portions joined with the connection rod 200, the frame coupler may include portions to be joined with the connection rod 200.

A variety of methods for joining the frame coupler with the connection rod 200 may be employed. The embodiment shown in FIG. 4 illustrates a configuration of adding a coupling member in a cylindrical shape (a pipe form) and inserting the connection rod 200 inside the coupling member to be combined with each other.

Canopy

A combination of the parafoil 400 and the canopy frames 110+120+130 will be referred to as the canopy (wing).

Drive Control Unit 300

The drive control unit 300 may include a motor or an engine, a propeller, a controller, a communication module, a battery, and the like. The drive control unit 300 provides a driving force or propulsion for the paradrone fuselage and may function to communicate with the ground. The drive control unit 300 is connected to a lower end of the connection rod 200.

Connection Rod 200

The connection rod 200 may be made of wood, plastic, carbon, a metal frame, etc., which are materials having strength, like as a canopy frame.

The connection rod 200 may be provided in one or two or more. The connection rod 200 may be configured in different shapes as needed, such as T-shape, Y-shape, etc. when viewed from the front side.

Although the embodiment shown in FIG. 1 to FIG. 4 illustrates using two connection rods 200, only a connection rod 200 may also be used as shown in FIG. 11 and FIG. 12.

First Embodiment

An upper end of the connection rod 200 is connected to the canopy (wing) while a lower end of the connection rod 200 may be connected to the drive control unit 300.

A role of the connection rod 200 is to arrange the canopy above the drive control unit 300 in order to maintain a parachute-like shape.

The center of gravity of the paradrone fuselage is present in the drive control unit 300. Positioning the center of gravity on a lower portion of the canopy may allow the canopy to slowly land such as the parachute without falling down in a situation where the drive control unit 300 does not provide the driving force.

An aerial vehicle consisting of the canopy (400+110+120+130), the connection rod 200 and the drive control unit 300 may include the following advantages.

1. A canopy consisting of a canopy frame and a parafoil without lines may significantly reduce manufacturing costs compared to the existing canopy manufacturing method.

2. The frame made of rigid material does not cause folding of wings.

3. Since the canopy and the drive control unit are connected to the connection rod having strength instead of flexible lines, twisting does not occur.

4. The connection rod may support the canopy to be held on the drive control unit, thereby improving stability of the paradrone and making it easy to take off.

Second Embodiment

Provided is a way to alter an angle (attack angle) of a connecting portion between the canopy and the connection rod 200 during flight, so as to adjust left and right directions of the paradrone fuselage even without lines, and a second embodiment enabling efficient flight by adjusting the attack angle of the canopy depending upon high-speed and low-speed flights will be described below.

There are a variety of methods for changing a direction of the paradrone fuselage.

According to the first embodiment, the parafoil at a rear side of the canopy may be fabricated to be larger, and the lines may be connected to change a direction in the same manner as the existing paraglider.

Alternatively, the change of direction may be performed by adding left and right rudders to a propeller of the drive control unit.

Hereinafter, the second embodiment of the present invention in regard to a combination of the servomotor with the canopy and the connection rod 200 to adjust the left and right directions will be described.

Although using a servomotor has been described as an example, other devices such as an actuator may also be used to adjust a connection angle between the connection rod 200 and the canopy.

In the present embodiment, a servomotor body 501, a servomotor arm 502, a servomotor body coupler 503 will be commonly referred to as a servomotor unit 500. FIG. 8 and FIG. 9 illustrate a configuration of the servomotor unit 500 and a method of combining horizontal and longitudinal canopy frame 110 and 120 with the connection rod 200.

Each of the servomotor units including two servomotor units on the left and right sides of the canopy is configured to be controlled at different angles.

FIG. 6 is an overall rear view of the canopy and the connection rod showing a configuration of the second embodiment, while FIG. 7 is an enlarged view of the right servomotor unit as well as the horizontal and the longitudinal canopy frames.

FIG. 8 and FIG. 9 are combined and exploded views of the left servomotor unit.

Servomotor Body 501 and Servomotor Body Coupler 503

The servomotor body 501 is operated by a power supply and a control signal line (+, −, control signal) connected to the drive control unit 300. The power supply and the control signal line are connected to the servomotor body 501 through the connection rod 200 from the drive control unit 300.

If the connection rod 200 is made of a pipe-shaped material, the above power supply and the control signal line may be put into the connection rod, otherwise, may be fixed to the connection rod.

A direction adjustment signal sent by a user may be transmitted to a communication unit of the drive control unit 300 through a wireless transmitter, converted into a control signal and then transmitted to the servomotor body 501, whereby an angle of the servomotor arm 503 may be altered according to the control signal.

In FIG. 7, the servomotor body 501 and the servomotor body coupler 503 are combined as a single component, wherein the component may be coupled to the connection rod 200 at a lower side thereof, and may be joined with the middle horizontal frame 111 at a lateral side thereof.

The servomotor body 501, the servomotor body coupler 503, the connection rod 200 and the middle horizontal canopy frame 111 are fixed to one another to inhibit a change of angle, while altering an angle of the servomotor arm 502.

Servomotor Arm 502

In FIG. 7, the right servomotor arm 502 is coupled to the right horizontal canopy frame 113 and the fourth longitudinal canopy frame 124 on the upper end. The right horizontal canopy frame 113 is connected to the fifth frame coupler 135 and the fifth longitudinal canopy frame 125.

By altering an angle of the servomotor arm 502, angles of the fourth longitudinal canopy frame 124, the right horizontal canopy frame 113 and the fifth longitudinal canopy frame 125 may also be altered, thereby changing an attack angle of the right canopy.

FIG. 10 illustrates an exemplary embodiment wherein, as an angle of the left servomotor arm 502 is altered, angles of the second longitudinal canopy frame 122 and the left horizontal canopy frame 112 may also be altered to exhibit the change of attack angle to a low, medium or high level. For convenience of description, the first frame coupler 131, the first longitudinal canopy frame 121 and the parafoil 400 connected to the left horizontal canopy frame 112 shown in FIG. 6 are not shown in FIG. 10.

Direction Adjustment

In FIG. 6, the horizontal canopy frame 112, the longitudinal canopy frames 121+122 and the first frame coupler 131 are coupled and fixed to the servomotor arm 502 at a left side, while the horizontal canopy frame 113 and the longitudinal canopy frames 124+125 are coupled and fixed to the servomotor arm 502 at a right side.

By adjusting an angle of the left servomotor arm, the attack angle on the left side of the canopy may also be altered. On the other hand, adjusting an angle of the right servomotor arm may change the attack angle on the right side of the canopy.

In order to turn to the left (that is, change a flight direction to the left side), increasing an attack angle of the left canopy while decreasing an attack angle of the right canopy may increase air resistance and the paradrone will fly to the left. On the other hand, in order to turn to the right, it will be enough to increase the attack angle of the right canopy.

The paradrone fuselage moves in either on eat a relatively larger attack angle among the left and right directions. In the case of high-speed flight, efficiency of high-speed flight may be improved by lowering the attack angles of both sides. On the contrary, in the case of low-speed flight, higher lift force may be ensured by increasing the attack angles of both sides.

Even during high-speed flight and low-speed flight, the change of direction is possible by differently altering angles on the left and right sides. This is because the paradrone fuselage rotates toward the relatively larger angle of attack.

An exemplary embodiment of direction adjustment will be described below.

For convenience, a low attack angle is defined as 0°, a middle attack angle is defined as 45°, and a high attack angle is defined as 90°, as shown in FIG. 10.

In order to turn to the left during straight flight with the middle attack angle of 45° on each of left and right sides, the attack angle on the left side should be altered to 90° while keeping the right side at 45°. Since the attack angle on the left side is higher than that on the right side to thus increase air resistance, the paradrone fuselage may rotate to the left side.

Another exemplary embodiment of direction adjustment during high-speed flight will be described below.

Because of the high speed, in order to turn to the right during straight flight with the low attack angle of 0° on both of left and right sides, the attack angle on the right side should be altered to 45° while keeping the left side at 0°. Since the attack angle on the right side is higher than that on the left side, the paradrone fuselage may rotate to the right side.

Third Embodiment

A third embodiment describes a configuration of the foldable canopy, so as to facilitate convenience of a user in movement on the ground and storage.

FIG. 11 illustrates the canopy unfolded for flight, and FIG. 12 illustrates the canopy folded for storage.

Foldable Horizontal Canopy Frame 600

Except for a difference that holes hole for fastening a bolt and nut 650 are present in the foldable horizontal canopy frame, the rest are the same as the horizontal canopy frame 110 in the first embodiment.

When the bolt and nut 650 shown in FIG. 11 are fastened to the foldable horizontal canopy frame 600 and the foldable first coupler 610, the left portion of the foldable horizontal canopy frame 600 is fixed to the top end of the connection rod 200 but the right portion (engaged with the foldable second coupler) may move up and down. That is, a coupling angle with the foldable first coupler 610 around the bolt and nut 650 as a central axis may be varied.

When fastening the bolt and nut 650, the fastening should not be executed strongly but need a little interval (or clearance), so as to move the right side of the foldable horizontal canopy frame 600 up and down.

Foldable First Coupler 610

In FIG. 11, the foldable first coupler 610 is connected and fixed to the connection rod 200 at a lower side, while also being connected and fixed to the third longitudinal canopy frame 123 at a top end thereof.

Further, the foldable first coupler may have holes, through which the foldable horizontal canopy frame 600 is fastened to the bolt and nut 650, on the left and right sides. The holes as well as the bolt and nut 650 are a portion at which an angle of the foldable horizontal frame can be altered.

Foldable Second Coupler 620

In FIG. 11, the foldable second coupler 620 is connected to the right side of the foldable horizontal canopy frame 600. A foldable support 630 is fastened to a lower end of the coupler with the bolt and nut 650 while having a clearance therebetween, so as to alter a coupling angle with the foldable support 630.

Foldable Support 630

In FIG. 11, the foldable support 630 is connected to the foldable second coupler 620 on one side thereof, while also being connected to a foldable fixture 640 on the other side thereof. Both of these portions are fastened with the bolt and nut 650 while having a clearance therebetween, whereby both sides may vary in angle.

Depending upon a vertical position of the foldable fixture 640, the foldable second coupler 620 may move up and down.

Foldable Fixture 640

In FIG. 11, the foldable fixture 640 is coupled to the connection rod 200 in a pipe shape and may move only up and down along the connection rod 200. The foldable support 630 and the bolt and nut 650 are fastened to the left and right sides thereof with a clearance therebetween, whereby the coupling angle with the foldable support 630 may be altered. Through a hole for fastening a fixing bolt 660, the foldable fixture 640 may be fastened with the fixing bolt 660 at a desired site on the connection rod 200, thereby securing the position.

As a vertical position of the foldable fixture 640 is varied, the foldable support 630 may fold or unfold the canopy by pushing up or down the foldable horizontal frame 600, and may secure a position by fastening the fixing bolt 660.

Adjustment of Angle of Canopy (Unfolding or Folding Motion)

When a user pushes up the foldable fixture 630 in a state in which the canopy of FIG. 12 is folded, the canopy is unfolded and flyable as shown in FIG. 11.

On the contrary, when the foldable fixtures 630 is lowered in a state in which the canopy is unfolded as shown in FIG. 11, the canopy may be foldable as shown in FIG. 12.

In case of spreading (or unfolding) the wings for flight, as shown in FIG. 11, the canopy may be unfolded by disposing the foldable fixture 640 on top of the connection rod 200 and then fastening the fixing bolt 660 to secure the position.

In case of folding the wings, the fixing bolt 660 is fastened and fixed to a lower end of the connection rod 200 as shown in FIG. 12.

According to a configuration as described above, the canopy may be folded or unfolded in the same manner as a motion of unfolding and folding an umbrella.

In addition to the third embodiment described above, other methods of folding the canopy may be used. For instance, when the bolt and nut 650 are strongly tightened at a portion where the foldable first coupler 610 and the foldable horizontal frame 600 are fastened with the bolt and nut 650 as shown in FIG. 11, in order to secure the foldable horizontal canopy frame not being moved, the canopy may be maintained in an unfolded state even without the foldable support 630 and the foldable fixture 640.

In case of folding, the canopy horizontal frame 600 may be folded by releasing the bolt and nut 650.

With regard to functions of the third embodiment, an essential component is the foldable first coupler 610 enabling adjustment of an angle of the foldable horizontal canopy frame 600.

As described above, the present invention has been described by way of limited embodiments and drawings but is not limited to the above embodiments, and those skilled in the art to which the present invention pertains will implement various modifications and variations from such descriptions. Therefore, the scope of the present invention should not be limited to the described embodiments, but will be determined by the appended claims below and equivalents thereof.

DESCRIPTION OF REFERENCE NUMERALS

400: parafoil 410: parafoil coupler
200: connection rod 300: drive control unit
110: horizontal canopy frame 111: middle horizontal canopy frame
112: left horizontal canopy frame 113: right horizontal canopy frame
120: longitudinal canopy frame 121: first longitudinal canopy frame
122: second longitudinal canopy frame 123: third longitudinal canopy frame
124: fourth longitudinal canopy frame 125: fifth longitudinal canopy frame
130; frame coupler 131: first frame coupler
132: second frame coupler 133: third frame coupler
134: fourth frame coupler 135: fifth frame coupler
500: servomotor unit 501: servomotor body
502: servomotor arm 503: servomotor body coupler
600: foldable horizontal canopy frame 610: foldable first coupler
620: foldable second coupler 630: foldable support
640: foldable fixture 650: bolt and nut
660: fixing bolt

The invention claimed is:

1. A paradrone, comprising:
a canopy, which is provided with a parafoil, a horizontal canopy frame coupled to the parafoil to support the parafoil, a longitudinal canopy frame that is coupled to the parafoil while having a bent structure to make the parafoil to generate lift force and is configured to intersect with the horizontal canopy frame, and at least one parafoil coupler to couple at least one among the horizontal canopy frame and the longitudinal canopy frame to the parafoil; and a servomotor unit, wherein the servomotor unit includes:
a servomotor body;
a servomotor body coupler coupled to the servomotor body to accommodate the servomotor body; and
a servomotor arm that couples and fixes the intersect portion of the horizontal canopy frame and the longitudinal canopy frame,
wherein the servomotor arm is connected to the servomotor body and rotates in a predetermined direction by driving the servomotor body, in order to alter an angle formed between the horizontal land longitudinal canopy frames and a travelling direction of a fuselage of the paradrone, thereby changing an angle of attack ("attack angle").

2. The paradrone according to claim 1, further comprising:
a drive control unit for supplying a driving force; and
a connection rod for connecting the drive control unit and the canopy.

3. The paradrone according to claim 2, wherein the at least one frame coupler is a foldable coupler to vary and secure a coupling angle of the horizontal canopy frame and the connection rod.

4. A paradrone, comprising a canopy, which is provided with:
a parafoil;
a horizontal canopy frame coupled to the parafoil to support the parafoil;
a longitudinal canopy frame that is coupled to the parafoil while having a bent structure to make the parafoil to generate lift force and is configured to intersect with the horizontal canopy frame; and
at least one parafoil coupler to couple at least one among the horizontal canopy frame and the longitudinal canopy frame to the parafoil.

5. The paradrone according to claim 4, further comprising:
a drive control unit for supplying a driving force; and a connection rod for connecting the drive control unit and the canopy.

6. A paradrone, comprising:

a canopy, which is provided with a parafoil, a horizontal canopy frame coupled to the parafoil to support the parafoil, a longitudinal canopy frame that is coupled to the parafoil while having a bent structure to make the parafoil to generate lift force and is configured to intersect with the horizontal canopy frame, and at least one parafoil coupler to couple at least one among the horizontal canopy frame and the longitudinal canopy frame to the parafoil;

a drive control unit for supplying a driving force;

a connection rod to connect the canopy and the drive control unit;

left and right servomotors as well as servomotor arms, which are driven differently and are fixed to the connection rod or the drive control unit; and lines connected to the left and right servomotor arms, respectively, wherein the lines are connected to the servomotor arms on left and right sides at a rear of the parafoil, respectively, whereby these lines pull a left or right tail of the parafoil downward to change a direction when the servomotor arms are driven.

\* \* \* \* \*